No. 747,267.

Patented December 15, 1903.

UNITED STATES PATENT OFFICE.

MAGNUS SWENSON, OF MADISON, WISCONSIN.

PROCESS OF ELIMINATING SOLVENTS FROM SEEDS.

SPECIFICATION forming part of Letters Patent No. 747,267, dated December 15, 1903.

Application filed November 24, 1902. Serial No. 132,679. (No specimens.)

*To all whom it may concern:*

Be it known that I, MAGNUS SWENSON, a citizen of the United States, and a resident of Madison, in the county of Dane and State of Wisconsin, have invented an Improved Process of Eliminating Solvents from Exhausted Oleaginous Seeds, of which the following is a specification.

This invention relates to an improved process of eliminating solvent from oleaginous seeds from which the oil has been extracted by means of a solvent, as gasolene, benzole, or the like.

The object of the invention is to provide a process for more perfectly and economically eliminating the solvent from the exhausted seed—that is, seed from which the oil has been extracted—than can be done by the processes now in use. To this end the invention consists in the various steps and features hereinafter described and claimed.

A process for extracting oil from oleaginous seeds at present in common use consists in allowing a solvent, such as gasolene or benzole, to percolate through the seeds, which preferably have been first coarsely ground. Said solvent—gasolene, benzole, or the like—operates to absorb the oil in the seed. The percolators commonly used are large tanks with perforated bottoms, provided with pipes at the top for supplying solvent thereto and at the bottom for drawing off the solvent after it has taken up the oil contained in the seed. After the oil has been fully extracted from the seed (in which condition the seed will hereinafter be referred to as "exhausted") the solvent remaining in the mass of exhausted seed is eliminated therefrom and said exhausted seed used for feed. The elimination of the solvent from the exhausted seed has heretofore been a matter of considerable difficulty. It is usually effected by blowing steam into the percolator, which displaces the solvent and also evaporates it, the vapor being conducted from said percolator to a condenser, where it is recovered. The difficulty with this process, particularly with cotton-seeds and some other seeds, is that the steam partially condenses, causing the seed to become glutinous, thus making it almost impenetrable by the steam, which is apt to form channels and blow through without coming into contact with the solvent contained in said seeds. A great deal of the solvent will thus remain in the seed, necessitating that it be eliminated by subsequent drying, thus not only causing a loss of the solvent, but necessitating the additional expense of expelling the condensed steam from the exhausted seed.

I am aware that an improved process is now in use in which the exhausted seed is removed from the percolator by means of suitable mechanism and delivered gradually into a separator, which, however, eliminates the solvent in the same way as formerly—namely, by the use of steam—preferably acting in a partial vacuum in order to facilitate the evaporation of the solvent. This process, however, is open to the same objection as that first described for the reason that steam is allowed to come into contact with the exhausted seed, whereby a portion of said steam will be condensed and will render said seed glutinous and impermeable to steam, as in the first instance. These difficulties and objectional features are overcome by my improved process, which I will now describe.

When the seed is exhausted, vaporized solvent, gasolene, or benzole is admitted at the top of the percolator through a controlled supply-pipe which connects said percolator with a suitable boiler or generator. Said percolator has also at its lower end a controlled discharge-pipe. When the admission and discharge pipes are open, the pressure of the vaporized solvent admitted to said percolator from the boiler or generator will drive out the liquid solvent contained in the exhausted seed, which may be caught in any suitable receptacle placed beneath the discharge-pipe. It is obvious that as fast as the liquid solvent in the seed is driven out it will be replaced by the heated vaporized solvent, which will operate to evaporate any liquid solvent remaining in the seed and thoroughly dry the seed. As soon as all of the liquid solvent is driven out of the percolator vapor will escape through the discharge-pipe, thus indicating this fact to the operator. The vaporized solvent being heated to a high degree will heat the exhausted seed to the same degree and will operate to vaporize any liquid solvent which has been absorbed by the seed, and thus to thoroughly dry the seed. To insure that all of the liquid solvent is removed, I prefer to continue to pass a current of vaporized solvent through the percolator for a short period after the vapor begins to escape from the discharge-pipe. To avoid loss of solvent, I prefer to conduct the vaporized solvent which escapes from the percolator during this period to a suitable condenser. This can be conveniently effected by closing the first discharge-pipe and opening a second, which communicates with a suitable condenser. To prevent to the greatest extent possible condensation of the vaporized solvent in the percolator, I prefer to superheat said vaporized solvent. After the entire contents of the percolator has been thoroughly heated and dried in the manner above described the percolator is connected with a high vacuum, which will cause the solvent vapor to expand and become very much rarefied, so that but a very small quantity thereof will remain in said percolator. To facilitate the formation of a vacuum in the percolator, and thus the rarefaction of the vaporized solvent contained therein, I prefer to connect said percolator with a closed tank or receptacle of considerable size by means of a controlled pipe and to provide means, such as a suitable vacuum-pump, for maintaining the vacuum in said vacuum-chamber. Under a high vacuum—say twenty-eight (28) inches—one hundred cubic feet of this vapor will weigh not to exceed three-tenths ($\frac{3}{10}$) pounds, so that in a percolator containing two hundred (200) cubic feet or having a capacity of about six thousand (6,000) pounds of seed and where the space between the seed forms one-fourth ($\frac{1}{4}$) of the entire cubical contents of said percolator there would be about fifteen one-hundredths ($\frac{15}{100}$) of a pound of solvent, which amount is so small that it could be disregarded from an economical standpoint. In order to thoroughly eliminate every trace of solvent from the percolator, and thus entirely deodorize the seed contained therein, I next pass a current of hot air through said percolator, a sufficient quantity being passed through the same to carry off the last traces of the solvent. The exhausted seed thoroughly dry and deodorized are then removed from the percolator and are ready for use as feed.

By means of my process above described it is obvious that all traces of the solvent are thoroughly removed from the exhausted seed without subjecting the seed to the action either of steam or water, as has been done heretofore.

The great advantage of my process is that it is much more rapid and economical, as it wastes much less of the solvent and prevents the seed from becoming pasty and doughy, thus allowing a free circulation through the mass of the vaporized solvent and in this way making it easy to free the seed from the last traces of the solvent.

I claim—

1. The process of eliminating solvent from oleaginous seed consisting in first passing heated solvent vapor through the seed until the liquid solvent contained therein is vaporized and the seed dried and in then exhausting the vaporized solvent from said seed by means of a high vacuum, substantially as described.

2. The process of eliminating solvent from oleaginous seed consisting in first passing heated solvent vapor through the seed until the liquid solvent contained therein is vaporized and the seed dried, exhausting the vaporized solvent from said seed by means of a high vacuum and in then passing a current of heated air through said seed, substantially as described.

In testimony that I claim the foregoing as my invention I affix my signature, in presence of two subscribing witnesses, this 18th day of November, A. D. 1902.

MAGNUS SWENSON.

Witnesses:
E. FEWSON,
J. H. GIBSON.